(12) United States Patent
Kemp et al.

(10) Patent No.: US 7,784,508 B2
(45) Date of Patent: Aug. 31, 2010

(54) WEAR INDICATOR FOR A TIRE

(75) Inventors: Preston Butler Kemp, Clermont-Ferrand (FR); Benoit Foucher, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1175 days.

(21) Appl. No.: 11/377,514

(22) Filed: Mar. 16, 2006

(65) Prior Publication Data

US 2006/0213594 A1     Sep. 28, 2006

(30) Foreign Application Priority Data

Mar. 25, 2005   (FR) .................... 05 03062

(51) Int. Cl.
    *B60C 11/117*   (2006.01)
    *B60C 11/24*    (2006.01)
(52) U.S. Cl. .............. 152/154.2; 152/209.17; 152/DIG. 3
(58) Field of Classification Search .......... 152/154.2, 152/209.17, DIG. 3
    See application file for complete search history.

(56) References Cited

U.S. PATENT DOCUMENTS

| | | | |
|---|---|---|---|
| 3,653,422 A | | 4/1972 | French |
| 4,154,564 A | * | 5/1979 | French ................. 425/28.1 |
| 4,226,274 A | | 10/1980 | Awaya et al. |
| 6,042,383 A | * | 3/2000 | Herron ................. 434/238 |
| 6,523,586 B1 | * | 2/2003 | Eromaki et al. ........ 152/154.2 |
| 2002/0036039 A1 | * | 3/2002 | Shimura .............. 152/154.2 |
| 2005/0269003 A1 | * | 12/2005 | Fujii et al. ........... 152/154.2 |
| 2006/0037683 A1 | * | 2/2006 | Cuny et al. ........... 152/154.2 |
| 2009/0008009 A1 | * | 1/2009 | Mosko et al. .......... 152/154.2 |
| 2009/0095388 A1 | * | 4/2009 | Cuny et al. ........... 152/154.2 |

FOREIGN PATENT DOCUMENTS

| | | |
|---|---|---|
| EP | 0 250 113 A2 | 5/1987 |
| EP | 0 853 553 B1 | 6/1997 |
| EP | 1 574 363 A1 | 11/2003 |
| FR | 797.713 | 11/1935 |
| FR | 1.480.472 | 5/1966 |
| GB | 1 279 966 | 6/1972 |
| JP | 08-104113 * | 4/1996 |
| WO | WO 2004/050390 * | 6/2004 |

* cited by examiner

*Primary Examiner*—Steven D Maki
(74) *Attorney, Agent, or Firm*—Cohen Pontani Lieberman & Pavane LLP (57) ABSTRACT

A tire tread comprising a rolling surface and at least one wear indicator formed by at least one cavity which opens onto the rolling surface, wherein the geometrical shape of the trace of the cavity on the rolling surface changes as a function of the wear level of the tread and wherein the geometrical shape of said trace is an analogical expression of the tread's wear level.

35 Claims, 8 Drawing Sheets

Wear level

WEAR INDICATOR FOR A TIRE

FIELD OF THE INVENTION

The present invention concerns tread wear indicators for tires.

The "tread" of a tire is understood to mean a volume of rubber composition, delimited by two main surfaces one of which is intended to come into contact with the ground when the tire is rolling, and by lateral surfaces.

"Rolling surface" means the surface formed by the points of a tire's tread that come into contact with the ground when the tire is rolling.

"Wear level" of a tire tread means the ratio between the thickness that the tread has lost due to wear and the total thickness that the tread can lose before having to be changed or retreaded. Thus, a wear level of 25% means that the tread has lost a quarter of the rubber composition that can be worn away before changing (or retreading) becomes necessary. The wear level is generally expressed as a percentage; at a given moment not all the zones of the tread necessarily have the same wear level ("uneven wear").

Here, the term "tire" denotes any type of elastic casing, whether or not internally pressurized during service.

TECHNOLOGICAL BACKGROUND

As is known, the tread of a tire undergoes wear that results from the rolling of the tire. If the tread has grooves, the effect of this wear is to reduce the depth of the grooves, thereby degrading the performance of the tire on wet ground. On reaching a certain wear level, the tire no longer enables rolling to take place under optimum security conditions. The tire or its tread ("retreading") is then replaced or, if the residual thickness of the tread so allows, the grooves of the tread are cut out afresh.

The wear level of a tread can be monitored by measuring the depth of the grooves, but that operation requires a suitable measurement tool, which makes it rather troublesome. It has therefore long been proposed to position wear indicators on the rolling surfaces so as to alert the driver of the vehicle visually when the minimum tread groove depth has been reached. The use of colored rubber has often been envisaged: for example, patent FR 1 480 472 describes a tread containing colored materials that contrast against those of the tire, which appear when the wear limit permitted for the treads has been reached. Patent FR 797 713 proposes that a rubber plug should be incorporated in the tread, the said plug being divided diagonally into two differently colored parts. As the tread becomes worn, the distribution of the colors visible at the surface changes; when the visible part of the plug has changed color completely, the tire is due for changing. U.S. Pat. No. 4,226,274 describes a more recent example of implementing the same principle. However, the use of colored rubber has a number of drawbacks, particularly relating to the complexity and cost of the fabrication process; exact positioning within the tread is difficult to ensure. Moreover, inserts of colored rubber may give rise to irregular wear.

The use of colored rubbers can be avoided by taking advantage of the visual contrast between the rubber forming the tread and a groove or cavity in the said tread. Patent GB 1,279,966 describes a tread provided with grooves of different depths distributed across the width of the tread: as the tire becomes progressively more worn, the number of grooves decreases; the number of grooves that remain allows conclusions to be drawn about the wear level of the tread. The same principle is also adopted in patent application EP 0 250 113 and patent EP 0 853 553; in the latter, cavities of different depths are distributed all around the circumference of the tire. This approach is noted for its ease of implementation; but it has one major disadvantage: the number of grooves or cavities present on the rolling surface at a given time during the tire's life does not give a precise indication of the wear level. In other words, although the user can perceive the state of wear progress visually, he does not know where the tread is in its "life cycle" unless he has information about the tread's geometry in its initial and final conditions.

Two approaches have been proposed to overcome that difficulty:

Patent application US 2002/0036039 proposes a wear indicator comprising two cavities of the same depth but with different geometries. The cross-section of one cavity in the rolling surface becomes smaller as the tire wear increases, while the cross-section of the other cavity remains constant. A comparison of the cross-sections of the two cavities indicates the wear level of the tread. This approach has the advantage of allowing a directly "readable" measurement of the tread's wear level; its drawback is that is requires two cavities of different shape or orientation, which increases the incision fraction of the rolling surface and can result in the creation of zones with uneven wear.

U.S. Pat. No. 3,653,422 adopts a different approach. A plurality of cavities with different depths are combined to form a wear indicator; each cavity has a cross-section whose shape contributes towards forming a message for the attention of the tire's user; as the tire becomes progressively more worn, the message changes. U.S. Pat. No. 6,523,586 uses the same idea by associating several cavities each of which has a trace (in the rolling surface) that corresponds to a number which expresses the residual thickness (in millimeters) the tread will have at the time when wear obliterates the cavity in question. Thus, when a tread of initial thickness 10 mm is reduced by wear to a thickness of 6 mm, the wear indicator, initially composed of nine cavities forming the numbers 1 to 9, will still have five cavities whose sections in the rolling surface correspond to the numbers 1 to 5. This system has the advantage of displaying the residual tread thickness as an absolute value, but it has some disadvantages. Firstly, it requires a large number of cavities, particularly if it is desired to determine the wear level at several positions across the width and periphery of the tread. Secondly, the user can be confused by the facts that several values are displayed at the same time, and that he must remember only to take note of the highest value (in the example above, when the residual thickness is 5 mm the numbers 1 to 5 appear on the rolling surface). Finally, it is related to a particular measurement system (the metric system in the example given) and requires adaptation in regions or for users unfamiliar with that system.

More recently, another type of indicator has been proposed which allows to detect the moment in time when the tires of a vehicle have to be interchanged ("rotated"). Patent application EP 1 574 363 describes an indicator formed by a cavity whose trace on the rolling surface changes as a function of the tread's wear level. When a given threshold is reached, the shape of the trace is radically changed, for example from a circular shape to a squared shape or vice versa. Such an indicator has the advantage of visibly signaling that a certain wear threshold has been reached, but it is difficult to identify the wear level at the moment of observation. The user has to look up a reference in order to know what the actual wear level is. This is particularly true when the indicator allows to distinguish several wear levels (as does the indicator of FIG. 3(h) of the cited patent application).

SUMMARY OF THE INVENTION

The first objective of the present invention is to provide a tread comprising a simple wear indicator which allows the wear level to be seen at a glance and which occupies a very small area on the rolling surface.

It must be stressed that these wear indicators must not be confused with the wear indication marks located at the bottom of the tread pattern, in the main grooves of the tire. The present invention is not intended to replace those marks, but to provide the tire's user with more complete information.

It is proposed to achieve that aim with a tread having a rolling surface and at least one wear indicator formed by a single cavity opening onto the rolling surface, wherein the geometrical shape of the cavity's trace on the rolling surface changes as a function of the wear level of the tread and wherein the geometrical shape of said trace is an analogical expression of the tread's wear level.

The shape of the trace is an "analogical expression" of the tread's wear level when this shape by itself directly expresses the wear level, without it being necessary to introduce another reference. In other words, an indicator in which the geometrical shape of said trace is an analogical expression of the tread's wear level allows the user to know the wear level at first glance, without referring to any reference; it is—so to say—self-explaining.

Thus an indicator according to the invention is different, for example, from an indicator of the type described in EP 1 574 363 where the geometrical shape of the trace by itself does not allow to know the wear level. The user has to refer to a reference document in order to identify the actual wear level. For example, the indicator may be such that its geometry becomes triangular at a wear level of 80%, but this wear level does not obviously follow from the triangular shape as such. The indicator disclosed in U.S. Pat. No. 6,523,586 does not allow to obtain an analogical expression of the wear level either as the indication of the residual tread thickness does not allow the user to know the actual wear level if he does not have in mind the total thickness to be worn. The same is true for the wear indicator taught by EP 0 250 113: although such an indicator allows to illustrate the progress of wear and to alert the user that a given threshold has been reached, the user is not able to directly know the wear level. In order to do so, he has to know the number of incisions and their arrangement as a function of the residual thickness of the tread.

The indicator of patent application US 2002/0036039 is closer to an analogical expression of the wear level, as the comparison of the area of two cavities, only one of which changes as a function of the wear level, allows to estimate the wear level. This type of indicator however has the drawback of necessitating the optical comparison of two distinct surfaces whereas this mental operation is not required in the case of an indicator according to the invention.

The change of the geometrical shape of the trace can take place discontinuously (in discrete steps) or continuously. Discontinuous change has the advantage of being less costly on an industrial scale (the manufacture of corresponding molding elements being less expensive) whereas continuous change allows the wear level to be displayed with higher precision.

According to a preferred embodiment, the wear indicator is formed by a single cavity opening onto the rolling surface. Thus a particularly compact display of information is obtained and the user can more easily read the wear level. This embodiment also has the advantage of reducing the number of molding elements needed for molding the indicator.

Preferentially, the area of the trace of the cavity changes as a function of the tread's wear level; thus the visibility and ease of lecture of the wear level is enhanced.

In particular, the area of the trace of the cavity may be a substantially linear function of the tread's wear level, which has the advantage of making the surface contribute to the analogical expression provided by the indicator.

The area of the said trace is considered to be a "substantially linear" function of the wear level when, during the wear of the tire, the said trace area varies in a linear or quasi-linear manner as a function of the wear level between its initial area $A_i$ (trace area at 0% wear) and a final area $A_f$ (trace area at 100% wear): the maximum deviation between the actual trace area and a linear function connecting $A_i$ to $A_f$—the deviations being determined at the same wear level—being less than 25% of the difference between $A_i$ to $A_f$ and more preferably less than 10% of that difference.

In principle the geometrical shape and the trace area can change independently of each other: each can change continuously or discontinuously (i.e. in discrete steps), but preferentially they change in the same way.

It has been found that a representation based on circular geometry is particularly advantageous for enabling the user to grasp the wear level information very quickly. Preferably, the trace of the cavity on the rolling surface is in the shape of a disc sector, the opening angle of the sector then being a function (and preferentially a substantially linear function) of the wear level of the tread. FIG. 6(b) shows how the opening angle (denoted as $\alpha$) is defined.

In an advantageous variant the trace of the cavity on the rolling surface comprises a ring sector, the opening angle of the ring sector being a substantially linear function of the tread's wear level. "Ring" is understood to mean the area between two concentric circles; FIG. 8(b) shows how the opening angle of the ring sector (denoted as $\beta$) is defined.

It should be noted that such round geometries also have the advantage of avoiding sharp angles that could serve as crack and tear initiation sites.

The reading of the wear level information can be facilitated still more by giving the cavity a geometry such that its trace on the rolling surfaces comprises a connecting surface and a plurality of parts connected to and projecting from the connecting surface, the number of projecting parts being a function of the tread's wear level. Again, it is advantageous that the number of projecting parts be a substantially linear function of the wear level. This enables the wear level to be evaluated simply by counting the number of projecting parts.

As the wear of the tread is not necessarily regular across the width of the tread, it can be advantageous to distribute a plurality of wear indicators according to the invention transversely, at several places on the rolling surface, enabling the wear level to be determined at different positions across the width of the tread.

Preferably, a plurality of wear indicators are arranged at regular intervals on the rolling surface, along the direction of its largest dimension, i.e. around the circumference of the tire when the tread is fixed on the tire.

The invention also concerns a tire comprising a tread according to the invention.

Since the geometrical shape of the trace of the cavity on the rolling surface changes as a function of the wear of the tread, it can be useful and advantageous to provide, on at least one sidewall of the tire that extends the tread, a visual means that reproduces the shape of the cavity's trace on the tread in its initial condition. Clearly, one could reproduce the shapes corresponding to several wear levels, if necessary associated with an indication of the tread thickness that can be worn away before reaching a limit for safe use.

The invention also concerns a molding element for molding a cavity in the rolling surface, this mounding element having a first part designed to anchor the molding element in the mould used to mould the rolling surface and a second part designed to mould the cavity itself, wherein the geometrical shape of the trace of the molding element in a plane P1 parallel to the plane P0 that separates the said first and second parts changes as a function of the distance between the planes P0 and P1, and in that the difference between the area of the trace in a plane P1 parallel to the plane P0 and the area of the trace in another plane P2 parallel to the plane P0 is a substantially linear function of the distance between the planes P1 and P2.

The invention will be better understood from the description of the drawings, in which.

DESCRIPTION OF EMBODIMENTS

Figure 1:
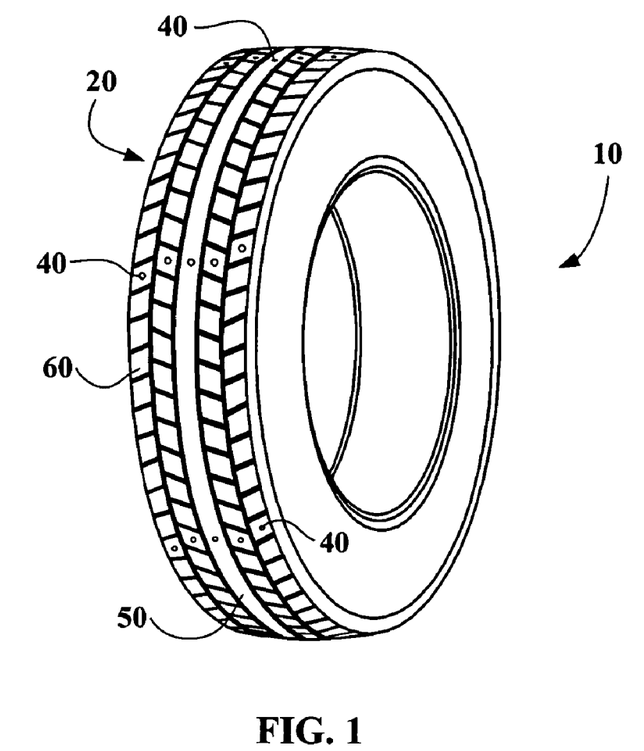
FIG. 1 is a schematic, perspective representation of a tire whose tread has a plurality of wear indicators.

FIG. 1 is a schematic perspective view of a tire 10 whose tread 20 has a plurality of cavities 40 that serve as wear indicators. The cavities 40 are arranged across the full width of the rolling surface, both in the central rib 50 and in the tread elements 60 of the tread 20. It can also be seen that cavities 40 are arranged at several positions around the circumference of the tire.

Figure 2:
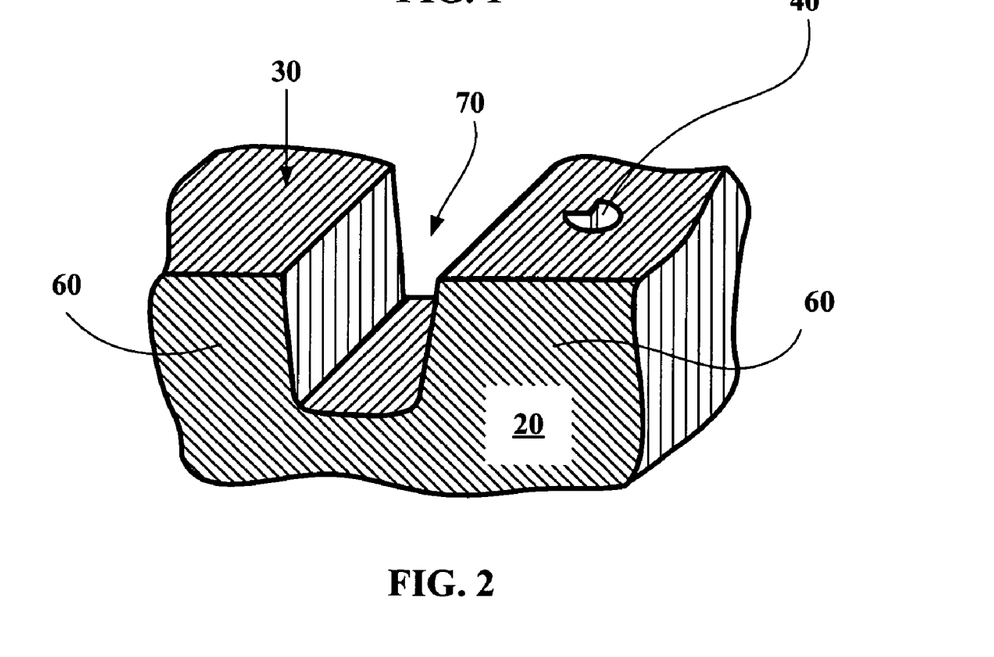
FIG. 2 is a schematic, perspective representation of a part of the tread shown in FIG. 1.

FIG. 2 is a schematic perspective view of part of a tread 20 according to the invention. The figure shows two tread elements 60 separated by a groove 70; on one tread element 60 a cavity 40 is provided in the rolling surface 30. The cavity 40 is of the same type as that represented in FIG. 6. In the example shown, the geometrical shape of the trace of the cavity 40 on the rolling surface 30 corresponds to a disc sector with an opening angle of 270°, corresponding to a tread wear level of 25%.

Figure 3:
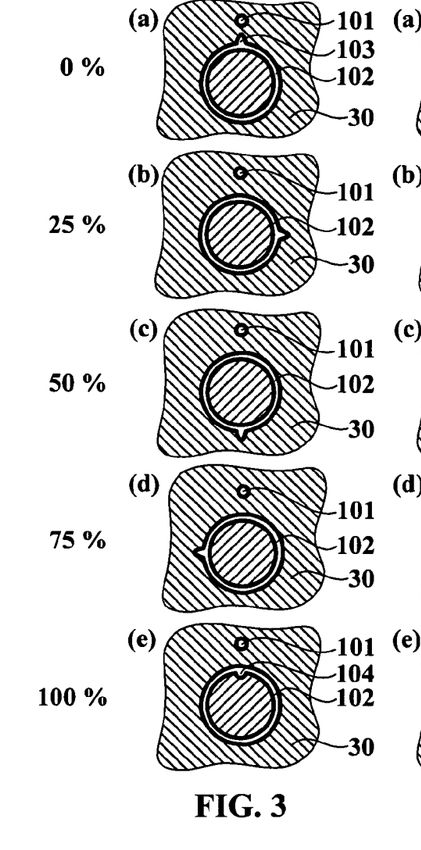
FIGS. 3 to 6 are schematic representations of the trace of a wear indicator according to the invention on the rolling surface, as a function of the wear level of the tread.

FIG. 3 is a schematic representation of the trace of a wear indicator according to the invention on the rolling surface 30, as a function of the tread's wear level. The indicator is formed by two cavities 101 (the trace of which is circular) and 102 (the trace of which corresponds to a ring with a protuberance 103) opening onto the rolling surface 30. As the tread becomes progressively worn, the geometrical shape of the indicator changes (the trace of the cavity 102 rotates around its centre whereas the position of cavity 101 remains unchanged). The position of the protuberance 103 with respect to the cavity 101 allows to read immediately the wear level if the convention of clockwise reading is adopted; there is no need to introduce another reference, to know the initial thickness of the tread, to compare surfaces etc. Therefore, the shape of the trace of the indicator is an analogical expression of the tread's wear level. However, the area of the trace does not change as a function of the tread wear. When the tread reaches its wear threshold, the protuberance 103 changes side (from a position that is radially external to the ring to a position that is radially internal to the ring) and transforms into protuberance 104; this allows to avoid that the indicator has the same trace at wear levels of 0 and 100%.

Figures 4, 5:
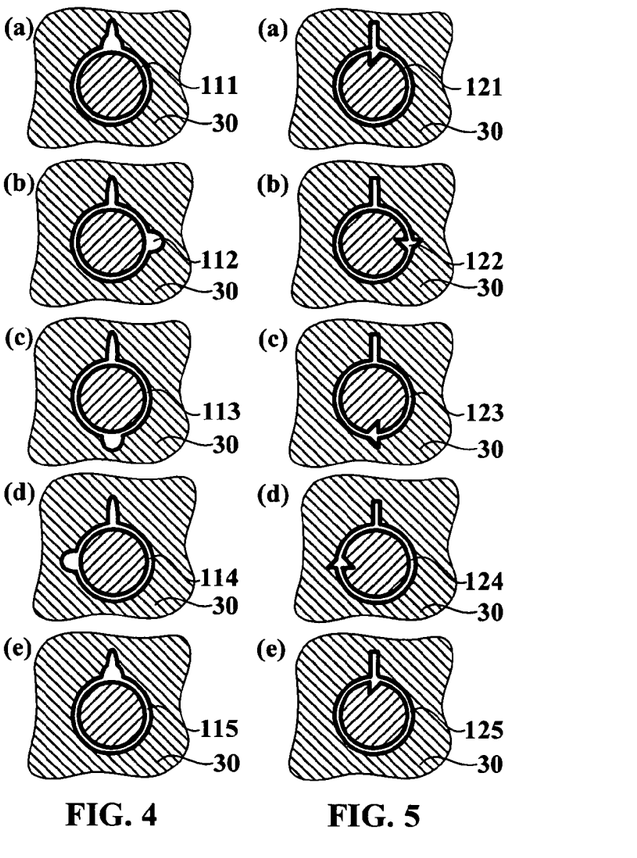

FIG. 4 is a schematic representation of the trace of another wear indicator according to the invention on the rolling surface 30, as a function of the tread wear level. The indicator is formed by a single cavity 111 opening onto the rolling surface 30. As the tread becomes progressively worn, the geometrical shape of the trace of the indicator changes in an analogous manner as the indicator of FIG. 3. The area of the trace is not constant: it increases slightly as soon as the tread starts to wear and diminishes when the tread wear level is close to 100%; therefore the area of the trace is not a linear function of the wear level.

The advantage of the indicator of FIG. 4 over the indicator of FIG. 3 mainly consists in the fact that a single molding element is needed, which simplifies the molding.

FIG. 5 is a schematic representation of a variant of the wear indicator of FIG. 4. The protrusion whose position changes as a function of the wear level has the shape of an arrow, which allows to make explicit the convention of clockwise reading, which is implicit in the indicators of FIGS. 3 and 4. As the tread becomes progressively worn, the trace of the cavity on the rolling surface 30 changes its geometrical shape, successively displaying the shapes 121 to 125. The area of the trace is not strictly constant.

Figure 6:
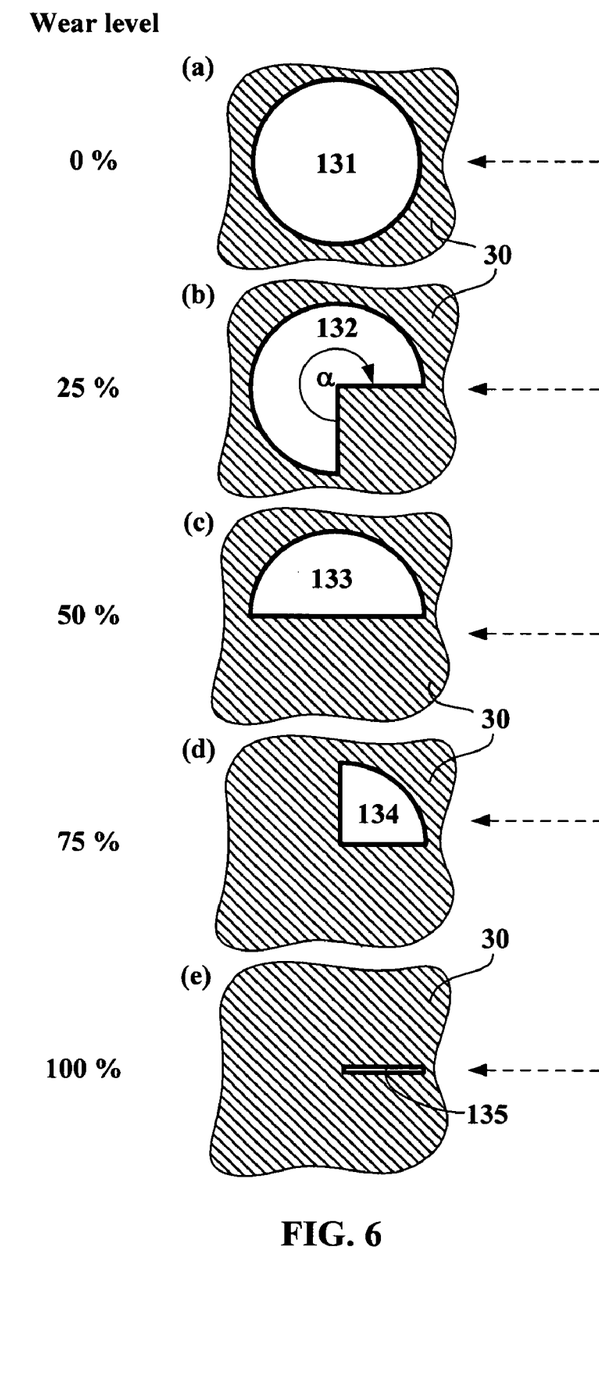

FIG. 6 is a schematic representation of the trace of a wear indicator according to the invention on the rolling surface 30, as a function of the wear level of the tread. In the initial condition of the tread, the trace 131 has the shape of a disc. As the tread becomes progressively worn, the trace of the cavity on the rolling surface 30 takes the shape of a disc sector 132-135 whose opening angle α is a linear function of the wear level of the tread. In the example chosen, the geometry of the cavity has been chosen such that the cavity never disappears entirely, even at a wear level of 100%. Thus, the user is reminded of the presence of the wear indicator at that point on the rolling surface even when the wear of the tread is very advanced.

This indicator has the advantage of being more easily read than the indicators of FIGS. 3 to 5; moreover, the unmolding is facilitated.

Figure 7:
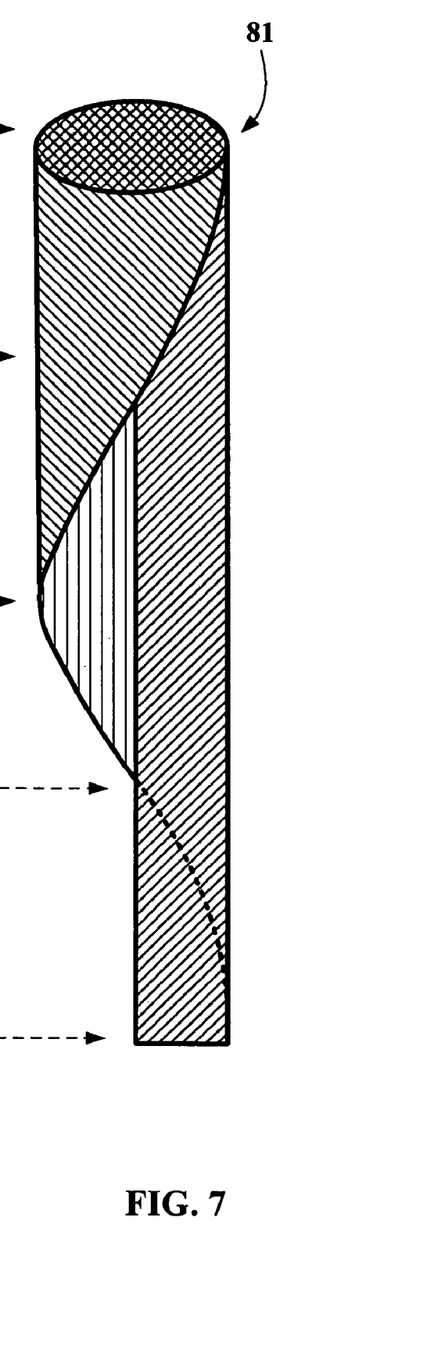
FIG. 7 is a schematic representation of a molding element that enables the wear indicator of FIG. 6 to be molded.

FIG. 7 is a schematic representation of a molding element 81 with which the wear indicator of FIG. 6 can be molded. The part that allows the molding element 81 to be fixed in the mould is not shown.

Figure 8:
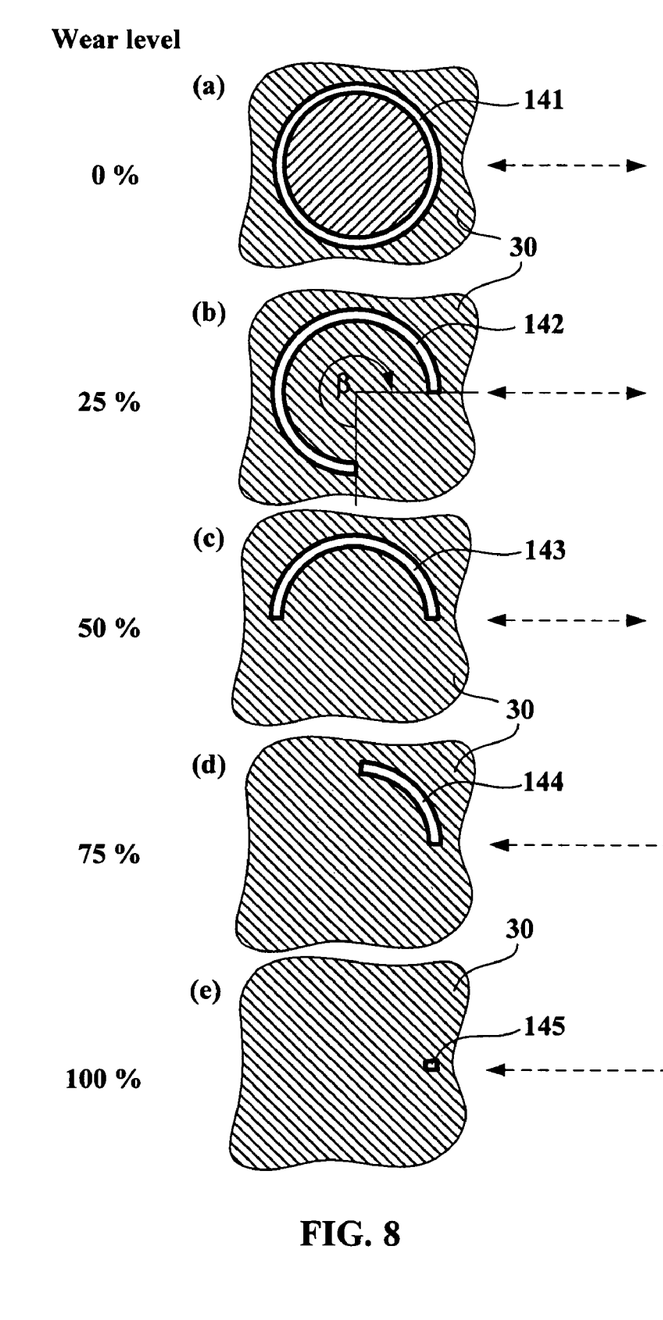
FIG. 8 is a schematic representation of the trace of another wear indicator according to the invention on the rolling surface, as a function of the wear level of the tread.

FIG. 8 represents schematically the trace of another wear indicator according to the invention on the rolling surface, as a function of the wear level of the tread. In the initial condition of the tread, the trace 141 has the shape of a ring. As the wear of the tread progresses, the trace of the cavity on the rolling surface 30 takes the form of a ring sector 142-145 whose opening angle β is a linear function of the wear level of the tread.

Figure 9:
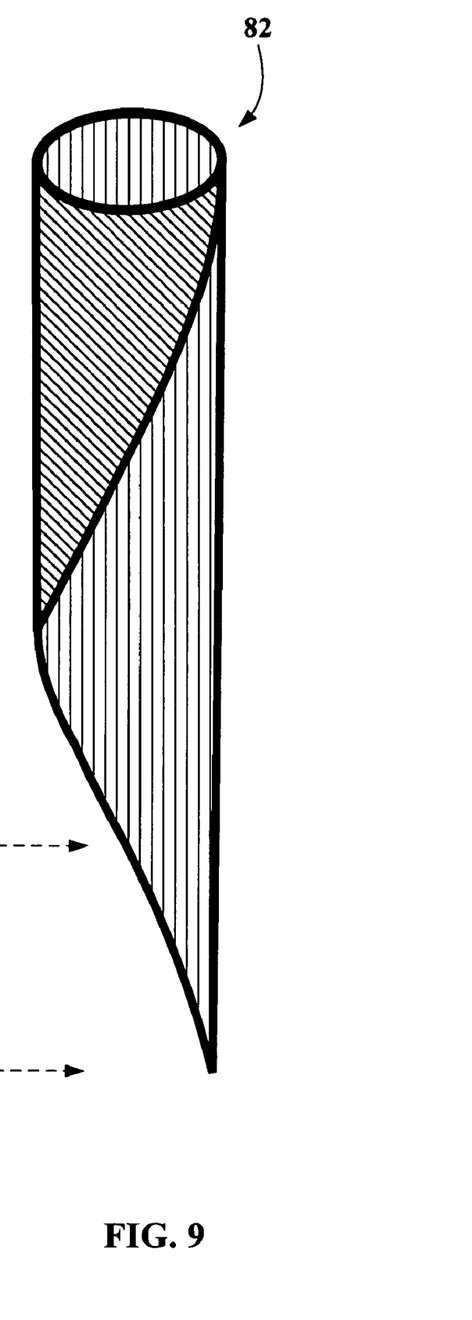
FIG. 9 is a schematic representation of a molding element that enables the wear indicator of FIG. 8 to be molded.

FIG. 9 is a schematic representation of a molding element 82 with which the wear indicator of FIG. 8 can be molded. In contrast to the molding element 81 of FIG. 7, this molding element is hollow. The part that allows the molding element 82 to be fixed in the mould is not shown.

Figure 10:
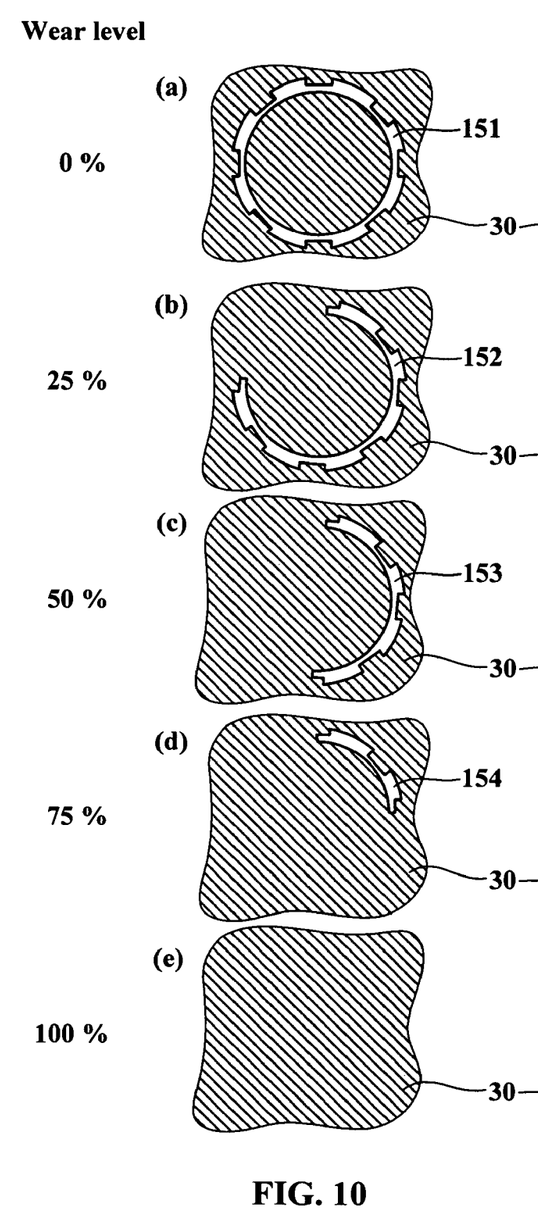
FIGS. 10 to 13 are schematic representations of the trace of other wear indicators according to the invention on the rolling surface, as a function of the wear level of the tread.
Figure 11:
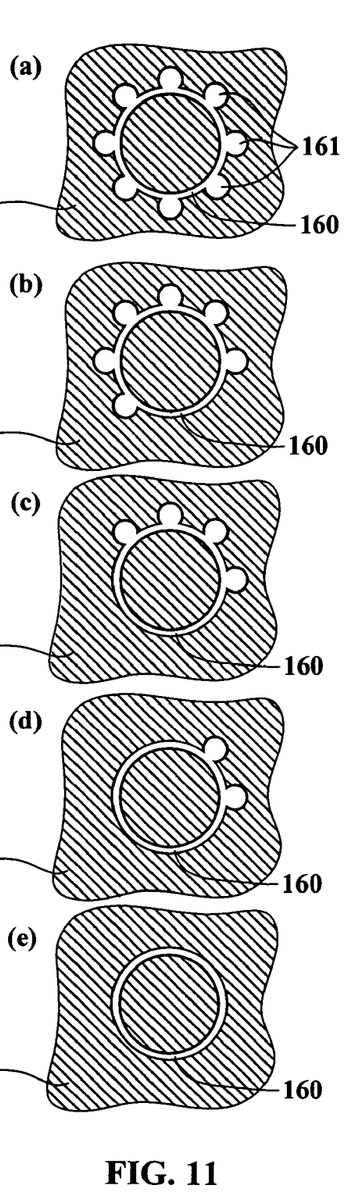

FIGS. 10 and 11 show schematic representations of the trace of other wear indicators according to the invention on the rolling surface 30, as a function of the wear level of the tread. In both cases the trace of the cavity on the rolling surface 30 comprises a ring-shaped connecting surface and a plurality of parts that project therefrom, each in the shape of a ring sector (FIG. 10) or a disc (FIG. 11). In the case of the wear indicator in FIG. 10, the connecting surface and the projecting parts disappear progressively as wear advances; in the case of the wear indicator of FIG. 11, only the projecting parts 161 disappear while the connecting surface 160 remains visible. Thus, the wear indicator of FIG. 11 has the advantage that the indicator does not disappear entirely when the wear level is very advanced. In both cases, counting the projecting elements that still remain is an easy way to determine the wear level. For example, the wear indicator shown in FIG. 11(d) only has two projecting parts left. Knowing that the indicator started with eight projecting parts, it can be seen that six parts out of eight (or 75%) have disappeared. The wear level is therefore 75%. In the case of the wear indicator of FIG. 11 the wear level is displayed with a resolution of 12.5%, but the fineness of the graduation can be increased or reduced by changing the number of projecting parts. It would of course be possible to have a wear indicator similar to that of FIG. 11, but without the connecting surface. The advantage of the geometry of the indicator of FIG. 11 is to gather together the parts whose number decreases as the wear level increases, in a way that "strikes the eye".

For the wear indicator of FIG. 10, the area of the trace of the cavity on the rolling surface is a substantially linear function of the wear level: the maximum deviation between the area of the trace and a linear function connecting $A_i$ to $A_f$ depends on the size of the connecting surface and the parts projecting therefrom; typically, the maximum deviation is less than 5% of the difference between $A_i$ and $A_f$.

With regard to the wear indicator of FIG. 11, the area of the cavity's trace on the rolling surface is a staircase function of the wear level. The maximum deviation between the area of the trace and a linear function connecting $A_i$ to $A_f$ depends on the number of projecting parts; in the example shown it is 12.5%.

Figure 12:
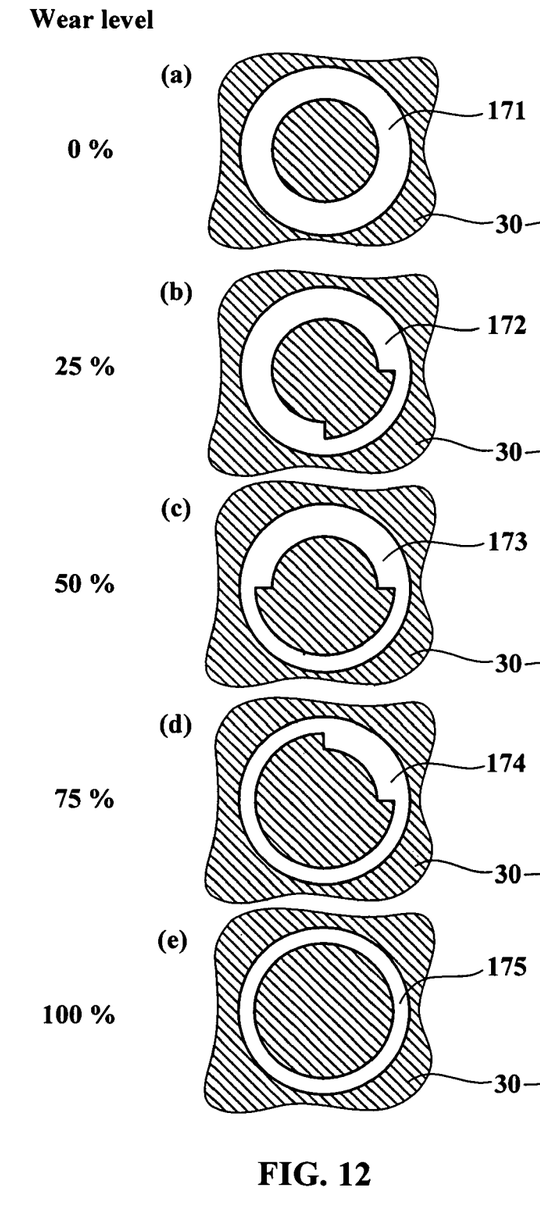

FIG. 12 is a schematic representation of the trace of another wear indicator according to the invention on the rolling surface, as a function of the wear level of the tread. In the initial state of the tread, the trace 171 is shaped as a ring. As the tread becomes progressively worn, the trace of the cavity on the rolling surface 30 takes the shape of a combination of a ring with a ring sector whose opening angle is a linear function of the wear level of the tread. When the tread has reached its maximum wear level, the trace 175 of the cavity is again in the shape of a ring, but its radial thickness is smaller than that of the initial ring 171.

Figure 13:
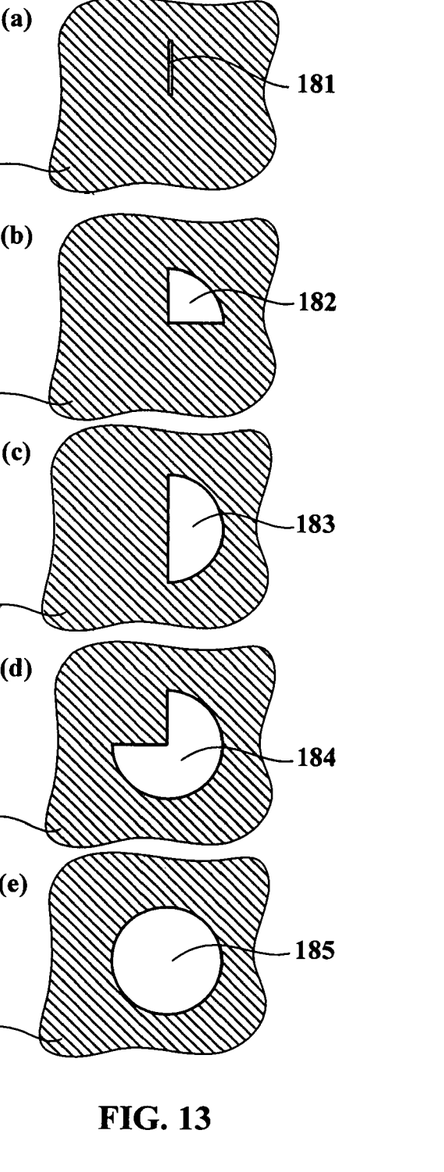

FIG. 13 is a schematic representation of the trace of another wear indicator according to the invention on the rolling surface, as a function of the wear level of the tread. In contrast to the indicators illustrated in the previous figures, the area of the cavity's trace on the rolling surface 30 increases with the wear level; this could be considered as the "negative" of the indicator of FIG. 6. The person skilled in the art will understand that such an indicator can only be molded when the tread is molded separately and fixed to the tire after being molded.

In the initial condition of the tread, the trace 181 hardly opens (or not at all) onto the rolling surface. As the tread becomes progressively worn, the trace of the cavity on the rolling surface 30 takes the shape of a disc sector 182-185 whose opening angle is a linear function of the wear level of the tread. When the cavity's trace on the rolling surface has become circular, the tread has reached its maximum wear level and must be replaced.

Figure 14:
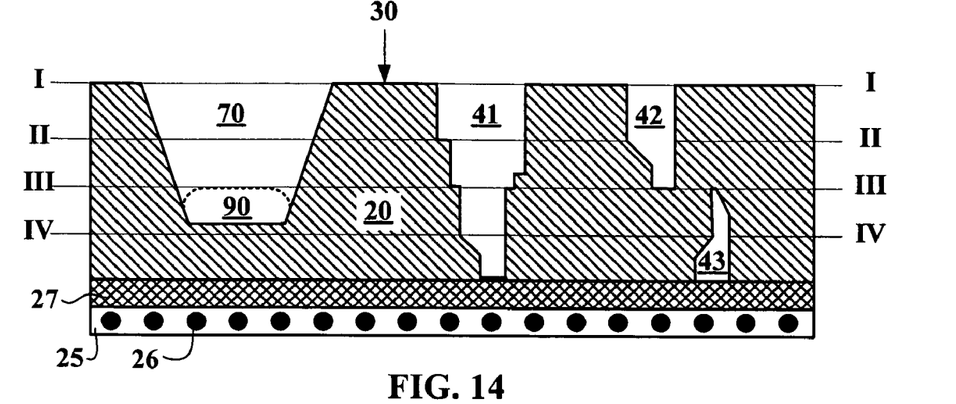
FIG. 14 is a schematic representation of a partial radial cross-section of a tire for a heavy vehicle, whose tread is provided with several wear indicators according to the invention.

FIG. 14 is a schematic representation of a partial radial section of a tire for a heavy vehicle. The figure shows a tread 20 separated from the ply 25 containing reinforcements 26 by a layer of rubber composition 27. In the portion of the tread 20 shown, a groove 70 can be seen in which there is a traditional wear indication mark 90, as well as wear indicators 41 to 43 according to the invention.

The tire in question can be re-grooved when the tread 20 has become sufficiently worn for the rolling surface 30 to have reached the wear mark 90. The wear indicators 41 to 43 are designed to enable the wear level to be monitored before and after re-grooving, as illustrated in FIGS. 15 to 18.

Figure 15:
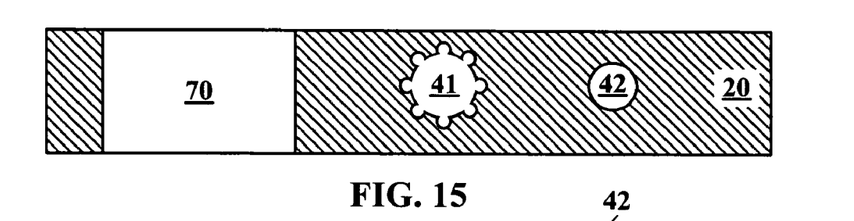
FIGS. 15 to 18 are schematic representations of a plan view of the section of tread shown in FIG. 14, at various wear levels.

FIG. 15 is a schematic plan view of part of the tread 20 of FIG. 14 in its initial condition (level indicated by the line I-I in FIG. 14). Only the indicators 41 and 42 open onto the rolling surface 30.

Figure 16:
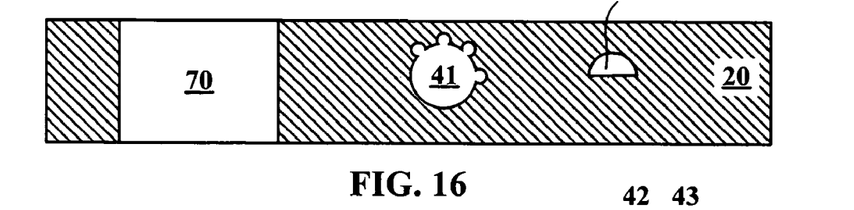

FIG. 16 shows the same part of the tread 20 after some wear. The rolling surface 30 has reached the level indicated by the line II-II in FIG. 14, corresponding to half of the wear possible before re-grooving, as indicated by the indicators 41 and 42.

Figure 17:
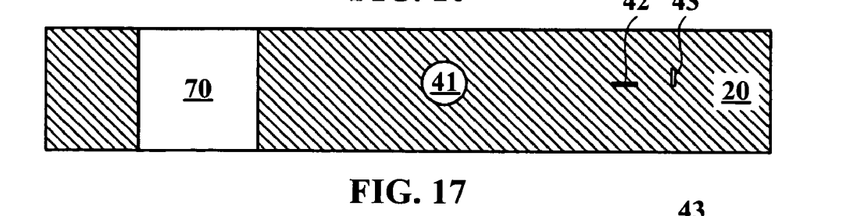

FIG. 17 shows the same part of the tread 20 at the time when the tread 20 must be re-grooved (level indicated by the line III-III in FIG. 14). The indicator 42 is on the point of disappearing and the indicator 43 appears on the rolling surface. Note that the geometry of the indicator 41 changes, passing from a geometry similar to that of FIG. 11 to a geometry equivalent to that of FIG. 6. Of course, the diameter of the circular trace of indicator 41 in FIG. 17 is not necessarily smaller than the diameter of the (circular) connecting surface of the same indicator in FIGS. 15 and 16.

Figure 18:
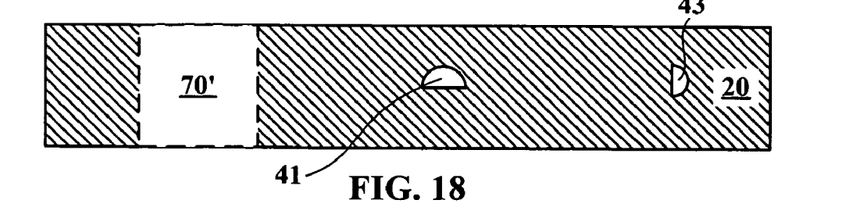

FIG. 18 shows the same part of the tread 20 after re-grooving: the groove 70 has been re-cut to form a new groove 70'. Only indicators 41 and 43 are left, and both indicate the wear level of the residual tread 20.

The person skilled in the art will understand that the wear indicator 43 can only be made when the tread is molded separately and fixed to the tire after being molded, as for example in the retreading process. The indicator 41 has the advantage that it can be molded even when the tread 20 is molded at the same time as the tire; its disadvantage is that its dimensions are relatively larger such that the indicator in use after re-grooving will have a large enough area.

Figure 19:
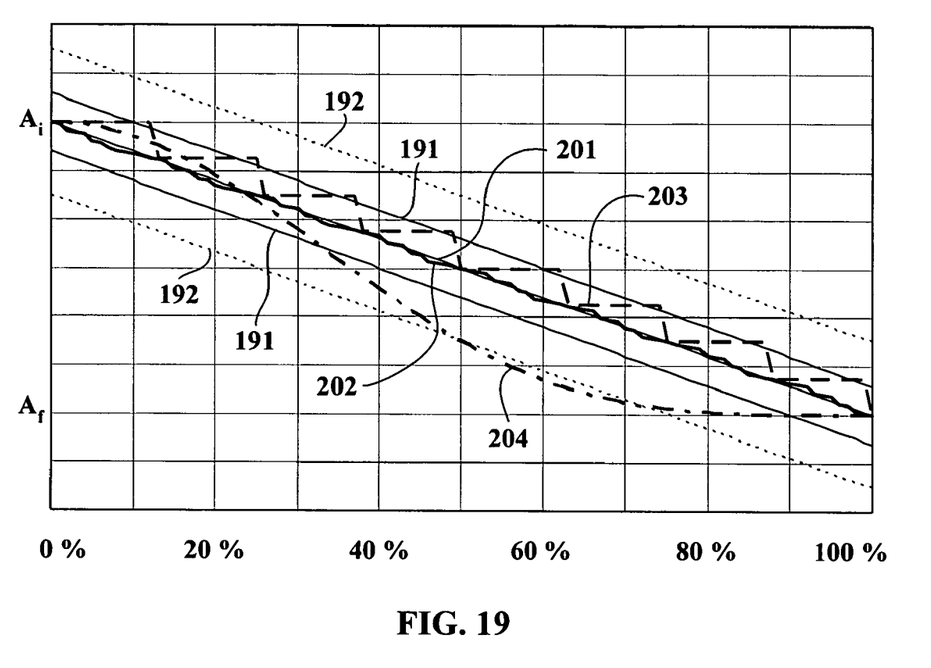
FIG. 19 shows the evolution of the area of the trace of several wear indicators as a function of the wear level.

FIG. 19 shows the evolution of the trace area of several wear indicators on the rolling surface, as a function of wear level. For an indicator such as those of FIGS. 6 and 8, the evolution of the area between its initial value $A_i$ and the final value $A_f$ is perfectly linear (full curve 201), for an indicator of the type in FIG. 10 there are slight deviations from the linear curve (full curve 202; $A_f$ is zero for the indicator of FIG. 10). The situation is a little different for an indicator such as that of FIG. 11 (broken curve 203): the area changes following a staircase function, with the disappearance of each projecting element corresponding to a distinct step.

The graph also shows the margins corresponding to a deviation of 10% (full lines 191) and 25% (dotted lines 192) relative to a linear function between the values $A_i$ and $A_f$. As can be seen, the indicators according to the invention that change in a continuous manner (line 202) deviate from the linear curve by amounts significantly less than 10% of the difference between $A_i$ and $A_f$. For the indicator according to the invention that corresponds to the curve 203 and that changes in discrete steps, the deviation is slightly larger than 10% but less than 25% of the difference between $A_f$ and $A_i$. In contrast, the curve 204 satisfies the 10% criterion up to a wear level of about 30%; at a wear level close to 60% its deviation from the "ideal" linear function is more than 25%. Thus, in contrast to the other cases represented the function 204 cannot be regarded as substantially linear.

In all the examples shown, the overall geometry of the cavity is close to a cylinder. For the reasons mentioned earlier, in effect a circular trace has considerable advantages, but this does not constitute a limitation of the invention: nothing prevents the person skilled in the art from giving the cavity a trace that is ellipsoid, square, polyhedral, etc.

When the trace of the cavity comprises a part in the shape of a disc or ring sector, it is of course possible to arrange for the radius of curvature of that part to change as a function of the wear level of the tread, taking care, if applicable that the area of the trace is reduced by an amount that is a substantially linear function of the tread's wear level. This observation applies *mutatis mutandis* to the dimensions that characterize the trace if it is ellipsoidal, square, polyhedral, etc.

Finally, the orientation of the cavity does not necessarily have to be perpendicular to the rolling surface. There is no reason not to have wear indicators that extend into the tread in a direction inclined relative to the direction perpendicular to the rolling surface.

In most of the indicators according to the invention that have been represented, the area of the indicator's trace on the rolling surface is reduced by an amount which is a substantially linear function of the wear level of the tread, so as to enable the user to monitor the progress of wear. Those with knowledge of the field will understand that it could be interesting, for certain applications, to choose instead a non-linear function (such as the function 204 in FIG. 19), for example to warn the user that the end of the tread's life has been reached, even before that is effectively the case.

Lastly, it may be mentioned that the progress of the tread's wear, as revealed by the wear indicators according to the invention, can be monitored automatically by image analysis.

We claim:

1. A tire tread comprising a rolling surface and at least one wear indicator formed by at least one cavity which opens onto the rolling surface, the cavity having a trace on the rolling surface, the trace having an area and a geometrical shape,
    wherein the area of the trace of the cavity changes as a function of the wear level of the tread,
    wherein the geometrical shape of the trace of the cavity changes as a function of the wear level of the tread, and
    wherein the trace is a disc sector with an opening angle ($\alpha$) that changes in size as a function of the wear level of the tread.

2. The tread of claim 1, wherein the change of the geometrical shape of the trace takes place discontinuously.

3. The tread of claim 1, wherein the change of the geometrical shape of the trace takes place continuously.

4. The tread of claim 1, wherein the wear indicator is formed by a single cavity opening onto the rolling surface.

5. The tread of claim 1, wherein the area of the trace of the cavity is a substantially linear function of the wear level of the tread.

6. The tread of claim 1, wherein the change of the area of the trace takes place discontinuously.

7. The tread of claim 1, wherein the change of the area of the trace takes place continuously.

8. The tread of claim 1, wherein the at least one wear indicator comprises a plurality of wear indicators arranged transversely, at several places on the rolling surface.

9. The tread of claim 1, wherein the at least one wear indicator comprises a plurality of wear indicators arranged at regular intervals on the rolling surface, in the direction of its largest dimension.

10. A tire comprising the tread of claim 1.

11. The tire of claim 10, wherein the tire comprises at least one sidewall which extends the tread and wherein the tire has at least one visual means on at least one sidewall, the visual means reproducing at least the trace of the cavity on the rolling surface of the tread in its initial state.

12. The tire of claim 11, wherein the visual means reproduce the trace of the cavity in the initial condition and in at least one other, predetermined wear level.

13. A tire tread comprising a rolling surface and at least one wear indicator formed by at least one cavity which opens onto the rolling surface, the cavity having a trace on the rolling surface, the trace having an area and a geometrical shape,
    wherein the area of the trace of the cavity changes as a function of the wear level of the tread,
    wherein the geometrical shape of the trace of the cavity changes as a function of the wear level of the tread, and
    wherein the trace of the cavity comprises a ring sector with an opening angle ($\beta$) that changes in size as a function of the wear level of the tread.

14. The tread of claim 13, wherein the change of the geometrical shape of the trace takes place discontinuously.

15. The tread of claim 13, wherein the change of the geometrical shape of the trace takes place continuously.

16. The tread of claim 13, wherein the wear indicator is formed by a single cavity opening onto the rolling surface.

17. The tread of claim 13, wherein the area of the trace of the cavity is a substantially linear function of the wear level of the tread.

18. The tread of claim 13, wherein the change of the area of the trace takes place discontinuously.

19. The tread of claim 13, wherein the change of the area of the trace takes place continuously.

20. The tread of claim 13, wherein the at least one wear indicator comprises a plurality of wear indicators arranged transversely, at several places on the rolling surface.

21. The tread of claim 13, wherein the at least one wear indicator comprises a plurality of wear indicators arranged at regular intervals on the rolling surface, in the direction of its largest dimension.

22. A tire comprising the tread of claim 13.

23. The tire of claim 22, wherein the tire comprises at least one sidewall which extends the tread and wherein the tire has at least one visual means on at least one sidewall, the visual means reproducing at least the trace of the cavity on the rolling surface of the tread in its initial state.

24. The tire of claim 23, wherein the visual means reproduce the trace of the cavity in the initial condition and in at least one other, predetermined wear level.

25. A tire tread comprising a rolling surface and at least one wear indicator formed by at least one cavity which opens onto the rolling surface, the cavity having a trace on the rolling surface, the trace having an area and a geometrical shape,
    wherein the area of the trace of the cavity changes as a function of the wear level of the tread,
    wherein the geometrical shape of the trace of the cavity changes as a function of the wear level of the tread, and wherein the trace of the cavity comprises an annular hole having a ring-shaped inner surface and a ring-shaped outer connecting surface and a plurality of spaced apart projecting parts each having one end connected to and extending from the ring-shaped outer connecting surface and another end terminating in the rolling surface of the tread, the number of projecting parts being a function of the wear level of the tread.

26. The tread of claim 25, wherein the wear indicator is formed by a single cavity opening onto the rolling surface.

27. The tread of claim 25, wherein the area of the trace of the cavity is a substantially linear function of the wear level of the tread.

28. The tread of claim 25, wherein the at least one wear indicator comprises a plurality of wear indicators arranged transversely, at several places on the rolling surface.

29. The tread of claim 25, wherein the at least one wear indicator comprises a plurality of wear indicators arranged at regular intervals on the rolling surface, in the direction of its largest dimension.

30. The tread of claim 25, wherein the ring-shaped outer connecting surface is unchanged at different wear levels.

31. The tread of claim 25, wherein the plurality of projecting parts have a same shape on their respective rolling surfaces.

32. A tire comprising the tread of claim 25.

33. The tire of claim 32, wherein the tire comprises at least one sidewall which extends the tread and wherein the tire has at least one visual means on at least one sidewall, the visual means reproducing at least the trace of the cavity on the rolling surface of the tread in its initial state.

34. The tire of claim 33, wherein the visual means reproduce the trace of the cavity in the initial condition and in at least one other, predetermined wear level.

35. The tire of claim 32, wherein the area of the trace of the cavity is a substantially linear function of the wear level of the tread.

* * * * *